United States Patent [19]
Sham et al.

[11] Patent Number: 5,957,034
[45] Date of Patent: Sep. 28, 1999

[54] COFFEE MAKER

[75] Inventors: John C. K. Sham, Hong Kong, The Hong Kong Special Administrative Region of the People's Republic of China; Kumkit KunavongVorakul, Bangkok, Thailand

[73] Assignee: Wing Shing Products (BVI) Co. Ltd., Aberdeen, The Hong Kong Special Administrative Region of the People's Republic of China

[21] Appl. No.: 09/075,541

[22] Filed: May 11, 1998

[51] Int. Cl.[6] .............................. A47J 31/00; A47J 31/06
[52] U.S. Cl. ................................ 99/285; 99/286; 99/307
[58] Field of Search ............................ 99/285, 286, 298, 99/307; 210/282, 481, 482, 464

[56] References Cited

U.S. PATENT DOCUMENTS

| | | |
|---|---|---|
| 4,889,041 | 12/1989 | Mahlich et al. ........................ 99/285 |
| 5,038,675 | 8/1991 | Hartel .................................... 99/286 |
| 5,634,395 | 6/1997 | Jouatel et al. .......................... 99/307 |
| 5,800,707 | 9/1998 | Mehnert et al. ..................... 99/286 X |
| 5,813,319 | 9/1998 | Lee ........................................ 99/299 |

*Primary Examiner*—Reginald L. Alexander
*Attorney, Agent, or Firm*—Salzman & Levy

[57] ABSTRACT

An improved household coffee maker is disclosed, having a built-in water filter for removing water-borne contaminants. The water filter is disposed between the water reservoir and the heating coil, which heats the water and keeps the coffee carafe warm. An indicator disposed upon the cover of the coffee maker signals when the water filter has become saturated with contaminants and requires replacement or cleaning.

19 Claims, 4 Drawing Sheets

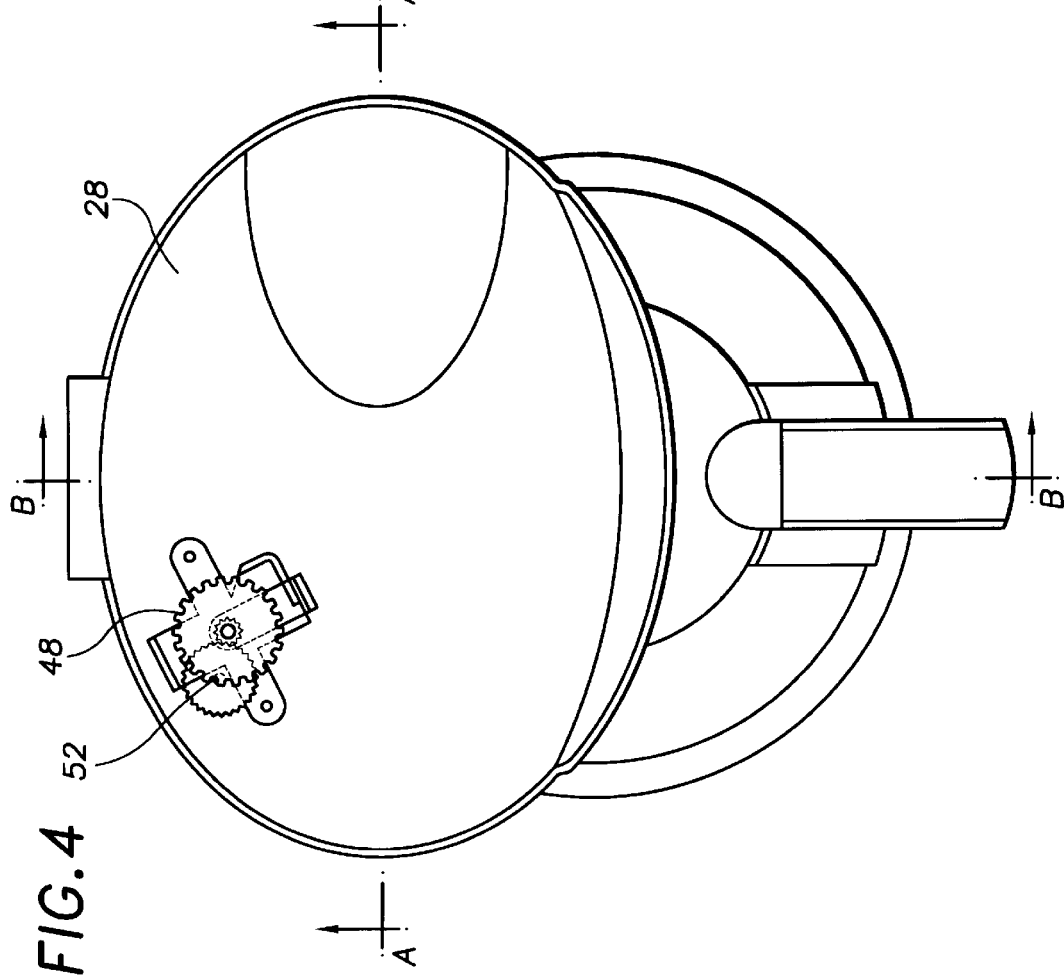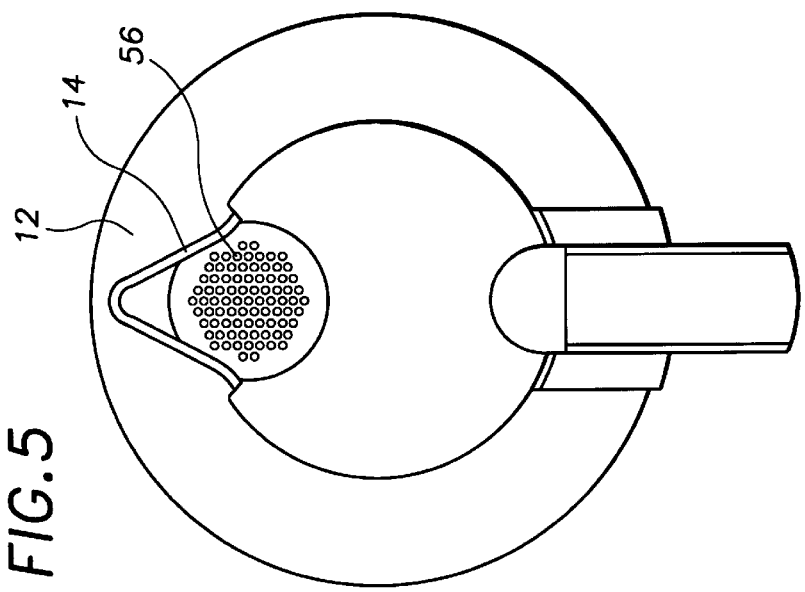

COFFEE MAKER

FIELD OF THE INVENTION

The present invention relates to coffee makers and, more particularly, to a counter-top coffee maker having an in-line water filter and a water filter aging sensor.

BACKGROUND OF THE INVENTION

In recent times, the counter-top coffee maker has become a ubiquitous part of the average American household. These counter-top coffee makers use a simple water heating system to brew coffee. Water is poured into a housing reservoir, generally disposed at the top or rear of the coffee machine. The water comes into contact with a heating coil disposed at the bottom of the coffee maker, where it is heated and then flashed into hot water by a spout disposed over a funnel. The hot water is directed into the funnel containing ground coffee. The hot water impinges upon the coffee grinds, causing the grinds to release their flavor. A coffee carafe is disposed below the funnel. The carafe is heated by the heating coil in order to keep the brewed coffee warm. The funnel often contains a paper or metallized filter for preventing the grinds and coffee bitters from dropping into the carafe.

The reason that this type of coffee maker has become so popular with the American public is its ability to brew a good cup of coffee fairly quickly and without much effort.

The American public is very particular about the taste of its coffee; many individuals will often spend many dollars in the pursuit of the best coffee blends and the finest beans. The American public is so obsessed with obtaining the best coffee, that every nuance to bring the best cup of coffee to the table is marketed. For example, special acid-free paper is sold for the funnel, so that the brewed coffee will not be soured by trace amounts of sulfuric acid used in paper processing.

It has recently been realized that despite all of the efforts of the individual to make the best coffee, the final result is greatly dependent upon the local water used in the coffee maker. Tap water in many areas is contaminated with traces of metals and other impurities that impart a poor taste to the brewed coffee. Not every household has water purification devices to clean the water of these unwanted contaminants.

The present invention has, as one of its objectives, to provide a coffee maker that has a built-in water filter, the filter of which is conveniently disposed in the water reservoir ahead of the heating coil. Water passing from the reservoir to the heating coil must pass through the built-in filter, thus leaving behind the water-borne impurities.

The current invention also reflects the discovery that the built-in filter will eventually become saturated with the contaminants, and will require replacement or cleaning. One of the problems associated with replacing the in-line filter is determining when a new filter is needed. Normally, an expensive photo-sensor would be required to detect the change in color of the contaminant-saturated filter. The cost of such a sensor would be prohibitive in a household appliance.

The invention reflects the discovery that an average filter will last long enough to brew a predetermined number of pots of coffee, depending upon the purity of the tap water being used. Therefore, an easy way to determine when the filter needs replacement is to count the number of times the water-filling lid is opened. The counter is used as a filter age indicator. Filter replacement is indicated in the inventive coffee maker when the lid is opened the indicated, predetermined number of times.

SUMMARY OF THE INVENTION

In accordance with the present invention, there is provided an improved household coffee maker. The coffee maker comprises a housing having a base for supporting a coffee carafe and a funnel disposed over the coffee carafe. The housing contains a water reservoir. The reservoir is filled with water that passes to the heating coil, where it is caused to heat and rise. The heated water is then flashed into hot water by a spout disposed atop a funnel. The hot water from the spout is directed into the funnel. The funnel contains ground coffee. The hot water from the spout impinges upon the ground coffee causing it to release its flavor to the heated water, which then passes into the carafe below. A water filter for removing water-borne contaminants is disposed between the heating coil of the base and the water reservoir. The reservoir comprises a lid, which is raised for receiving the water used to brew the coffee. A filter age indicator containing a counter is disposed upon the housing adjacent the lid. A lever system, operatively connected to the lid, trips a gear associated with the counter every time the lid is raised. This causes the counter to advance one unit. After a predetermined number of units has been counted the indicator signals the coffee operator to replace or clean the water filter.

It is an object of this invention to provide an improved household coffee maker for brewing a good pot of coffee.

It is another object of the invention to provide a household coffee maker having a built-in water filter for purifying the water used to brew the coffee.

It is a further object of this invention to provide a household coffee maker having a water filter and an indicator for signalling when the water filter has aged and requires replacement or cleaning.

BRIEF DESCRIPTION OF THE DRAWINGS

A complete understanding of the present invention may be obtained by reference to the accompanying drawings, when considered in conjunction with the subsequent detailed description, in which:

FIG. 4 illustrates a top view of the coffee maker depicted in FIG. 1, with its top cover; and FIG. 5 shows a plan view of the carafe of the coffee maker depicted in FIG. 1.

For purposes of clarity and brevity, like elements and components will bear the same designations and numbering throughout the figures.

DESCRIPTION OF THE PREFERRED EMBODIMENT

Generally speaking, the invention features an improved household coffee maker having a built-in water filter for removing water-borne contaminants. The water filter is disposed between the water reservoir and the heating coil, which heats the water and keeps the coffee carafe warm. An indicator disposed upon the cover of the coffee maker signals when the water filter has become saturated with contaminants and requires replacement or cleaning.

Figure 1:
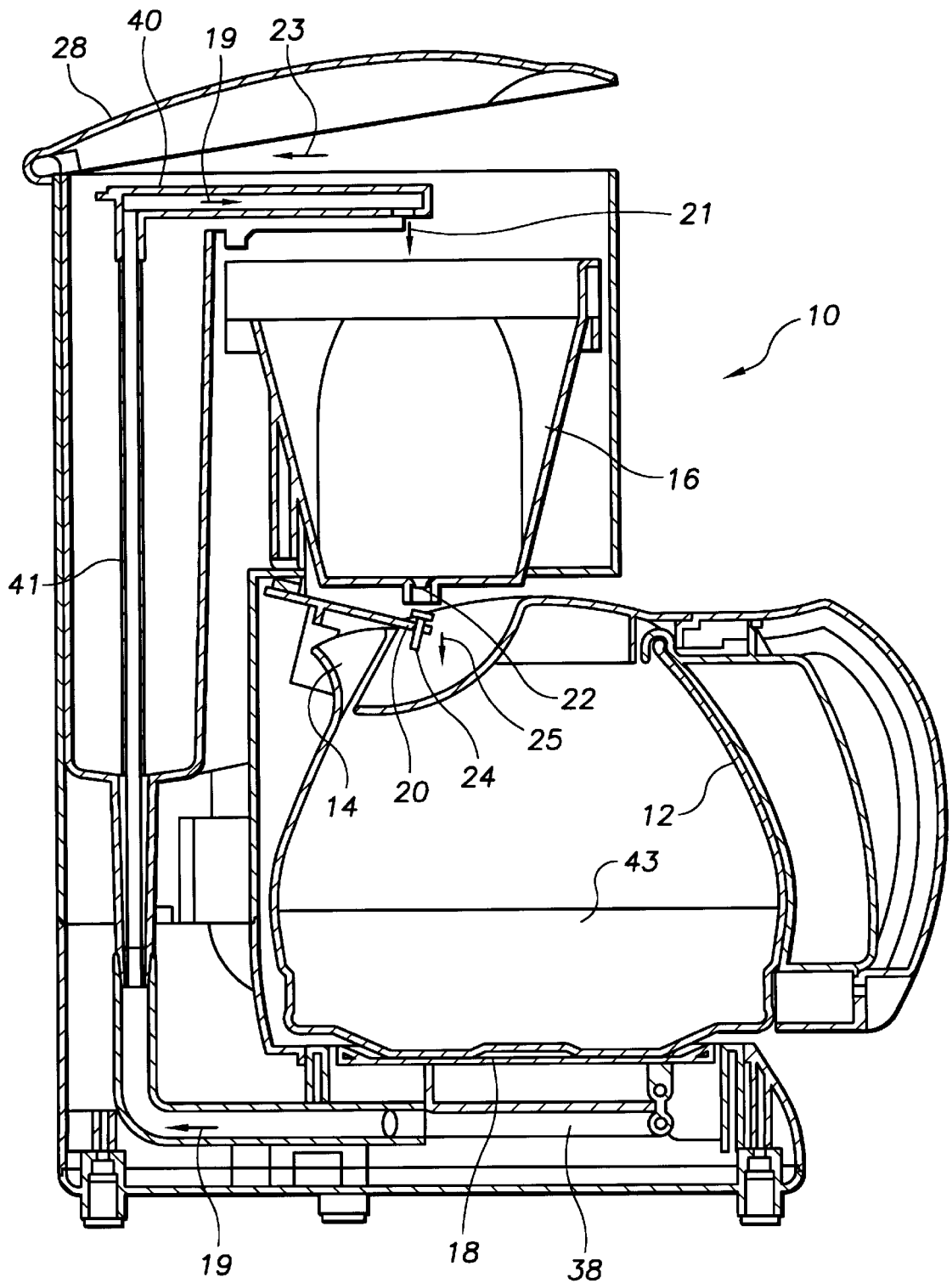
FIG. 1 illustrates a sectional side view of the coffee maker of this invention, as viewed along lines B—B of FIG. 4 below.

Now referring to FIG. 1, the coffee maker 10 of this invention is illustrated. The coffee maker 10 is in many respects of a standard design. One of the exceptions to the standard is the unusual domed-shaped carafe 12, which receives brewed coffee, not shown, directly into its pouring spout 14 from the funnel 16 disposed above with ground coffee. The shape of the carafe 12 resembles a teapot. Placing the carafe 12 upon the heating plate 18 of the coffee maker 10 causes a spring-biased lever 20 to move backwardly. The lever 20 comprises a water stopper 24 that is caused to move up and down (arrows 25) when the lever 20 is actuated. The movement of the water stopper 24 away from the funnel 16, allows brewed coffee to issue from the orifice 22 of the funnel 16 into the mouth of the spout 14 disposed directly below.

Figure 2:
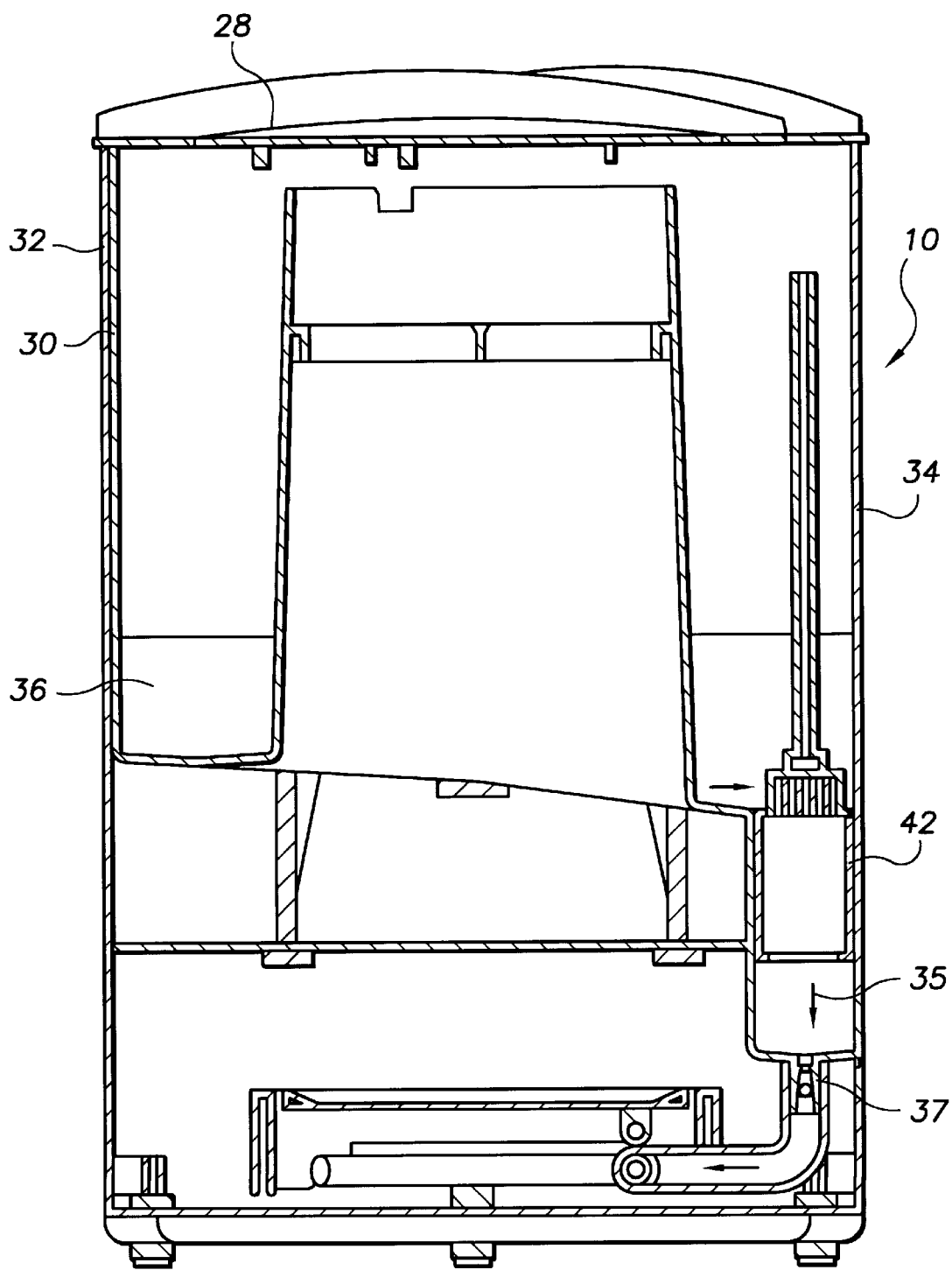
FIG. 2 depicts a sectional back view of the coffee maker as viewed along lines A—A of FIG. 4.
Figure 3:
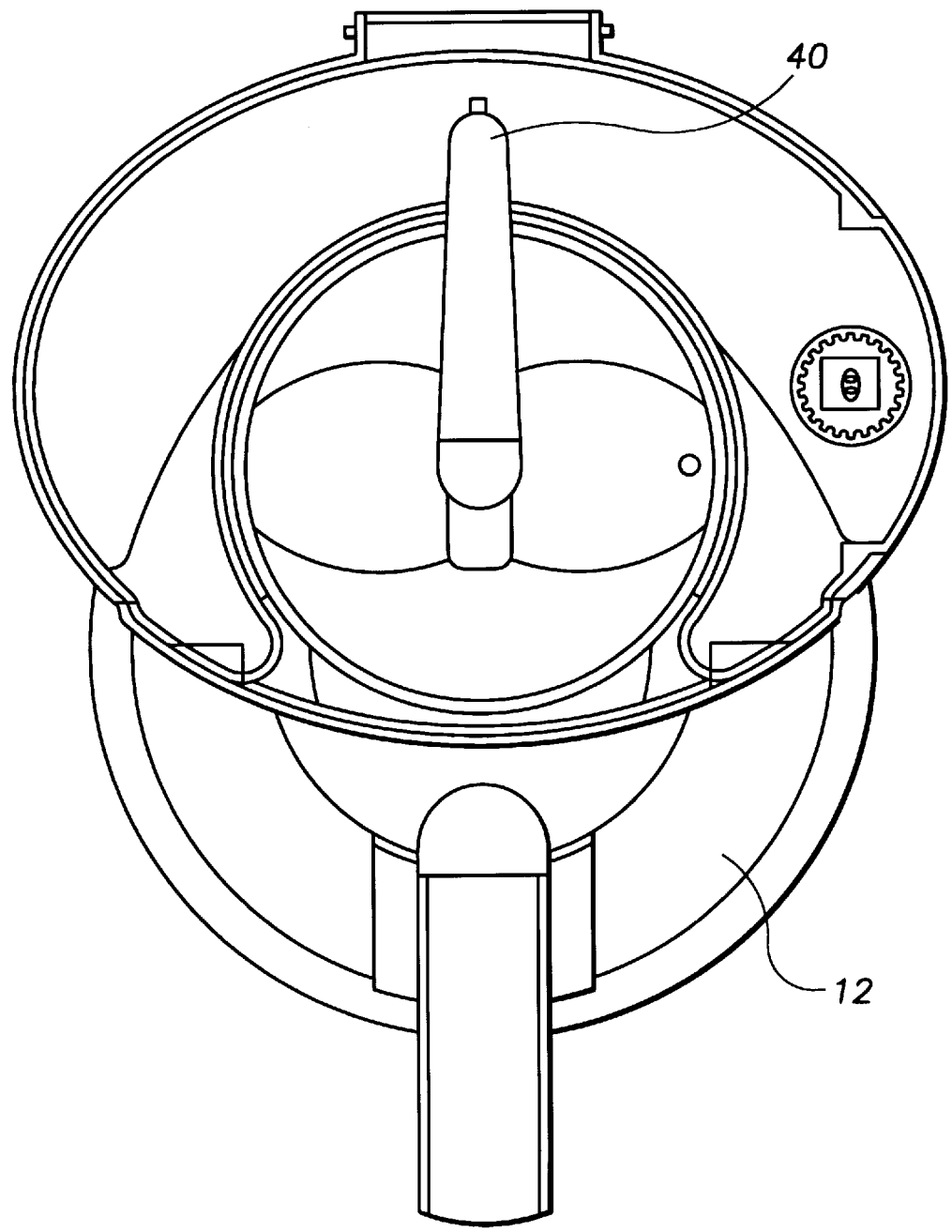
FIG. 3 shows a top view of the coffee maker depicted in FIG. 1, without its top cover.

Referring to FIG. 2, the coffee maker 10 is shown having a top cover 28. The lid 28 is opened to provide access to a water reservoir 30 disposed in the housing 32. Tap water is poured into the reservoir 30, as shown by arrows 23 (FIG. 1). A see-through portion of the reservoir 30 comprises a water level indicator 34. Water 36 disposed in the reservoir 30 is directed (arrows 35) to the heating coils of a heater 38 disposed below the heating plate 18. The water 36 enters the heater 38 through a check valve 37. The water 36 is heated by the heating coils of the heater 38 and rises (arrows 19) through the conduit 41 to enter a water spout 40, where it flashes into hot water and is directed downwardly (arrow 21) into funnel 16, as shown in FIGS. 1 and 3. The funnel 16 contains ground coffee, which is impinged upon by the hot water. The coffee then releases its flavor to the heated water. The brewed coffee 43 then drips into the carafe 12 disposed below. Disposed between the reservoir 30 and the heater 38 is an in-line water filter 42 that removes water-borne contaminants from the tap water.

Referring to FIG. 4, the top cover 28 is shown in more detail. The top cover 28 comprises a filter age indicator 48, which is used to signal the coffee operator that the filter 42 has become old and requires replacement or cleaning. Normally, the filter 42 will become discolored by the contaminants in the water, which can be observed in the see-through portion 34 of the reservoir 30. However, such discoloration is not always uniform, thus requiring the operator to make an educated guess.

The coffee maker of this invention, therefore, provides an additional filter age indicator or counter 48, which relies on a predetermined number of times that water passes through the filter 42. This number is also related to the number of times the top cover 28 is opened to pour the tap water 36 into the reservoir 30. A lever system is attached to the top cover 28. The lever system is, in turn, attached to a gear wheel (not shown), which is part of a unit counter. The filter age indicator 48 signals when the filter 42 needs replacement, based on the counter reaching a predetermined count. A sight window 52 is also provided at the top of the indicator 48 for viewing the indicator 48.

Referring to FIG. 5, the carafe 12 is shown in top view. It will be observed that the spout 12 that receives the brewed coffee 43 from orifice 22 of funnel 16 has a built-in filter 56, designed to catch any grounds that accidentally or inadvertently fall through the paper or metallized filter used to hold the coffee grounds within the funnel 16.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A coffee maker comprising:

a housing carrying a reservoir for receiving water for brewing coffee;

heating means supported by the housing for receiving water from said reservoir and heating said water in order to brew coffee;

means disposed between said reservoir and said heating means for passing water from said reservoir to said heating means;

a funnel disposed within said housing for containing coffee to be brewed;

a conduit disposed between said heating means and said funnel for carrying the heated water from the heating means to said funnel;

a water filter disposed between said reservoir and said heating means for removing water-borne contaminants from the water passing therethrough; and a cover disposed over said reservoir, said cover having means for introducing water into said reservoir and indicator means disposed on said cover for indicating the need for replacing or cleaning said water filter.

2. The coffee maker in accordance with claim 1, wherein said cover comprises a viewing window to observe a counter.

3. The coffee maker in accordance with claim 1, further comprising a movable top cover for accessing said reservoir and a counting means disposed adjacent to said lid and being operatively connected thereto for determining how often said lid is opened to access said reservoir, and hence for determining whether said water filter is old.

4. The coffee maker in accordance with claim 1, wherein said housing further comprises a see-through portion for observing said water level in said reservoir.

5. The coffee maker in accordance with claim 4, wherein said see-through portion for observing said water level in said reservoir contains said water filter.

6. The coffee maker in accordance with claim 3, wherein said counting means disposed adjacent said top cover further comprises adjustment means for adjusting the count required to determine whether said water filter is old.

7. The coffee maker in accordance with claim 1, further comprising a carafe with a pouring spout for receiving brewed coffee from said funnel through said pouring spout.

8. The coffee maker in accordance with claim 7, wherein said carafe has a substantially teapot shape.

9. The coffee maker in accordance with claim 7, further comprising a spring-biased, movable lever disposed adjacent said funnel, said carafe moving said lever to release brewed coffee from said funnel when disposed upon said heating means.

10. A coffee maker comprising:

a housing carrying a reservoir for receiving water for brewing coffee;

heating means supported by the housing for receiving water from said reservoir and heating said water in order to brew coffee;

means disposed between said reservoir and said heating means for passing water from said reservoir to said heating means;

a funnel disposed within said housing for containing coffee to be brewed;

a conduit disposed between said heating means and said funnel for carrying the heated water from the heating means to said funnel;

a water filter disposed between said reservoir and said heating means for removing water-borne contaminants from the water passing therethrough; and filter age indicator means carried by said housing for determining when to clean or replace said water filter.

11. The coffee maker in accordance with claim 10, further comprising a cover disposed over said reservoir, said cover having means for introducing water into said reservoir, said cover carrying said filter age indicator.

12. The coffee maker in accordance with claim 11, wherein said cover comprises a viewing window to observe the counter.

13. The coffee maker in accordance with claim 10, further comprising a movable top cover for accessing said reservoir, and said filter age indicator means comprises a counting means disposed adjacent to said top cover and being operatively connected thereto for determining how often said top cover is opened to access said reservoir, and hence for determining whether said water filter is old.

14. The coffee maker in accordance with claim 10, wherein said housing further comprises a see-through portion for observing said water level in said reservoir.

15. The coffee maker in accordance with claim 14, wherein said see-through portion for observing said water level in said reservoir contains said water filter.

16. The coffee maker in accordance with claim 13, wherein said counting means disposed adjacent to said top cover further comprises adjustment means for adjusting the count required to determine whether said water filter is old.

17. The coffee maker in accordance with claim 10, further comprising a carafe with a pouring spout for receiving brewed coffee from said funnel through said pouring spout.

18. The coffee maker in accordance with claim 17, wherein said carafe has a substantially teapot shape.

19. The coffee maker in accordance with claim 17, further comprising a spring-biased, movable lever disposed adjacent said funnel, said carafe moving said lever to release brewed coffee from said funnel when disposed upon said heating means.

* * * * *